(12) United States Patent
Kounavis et al.

(10) Patent No.: US 10,148,426 B2
(45) Date of Patent: *Dec. 4, 2018

(54) METHOD AND APPARATUS FOR EFFICIENTLY IMPLEMENTING THE ADVANCED ENCRYPTION STANDARD

(71) Applicant: Intel Corporation, Santa Clara, CA (US)

(72) Inventors: Michael E. Kounavis, Portland, OR (US); Shay Gueron, Haifa (IL); Ram Krishnamurthy, Portland, OR (US); Sanu K. Mathew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/881,121

(22) Filed: Oct. 12, 2015

(65) Prior Publication Data

US 2016/0204938 A1    Jul. 14, 2016

Related U.S. Application Data

(63) Continuation of application No. 14/569,428, filed on Dec. 12, 2014, which is a continuation of application (Continued)

(51) Int. Cl.
*H04L 9/06* (2006.01)
*G06F 7/00* (2006.01)
(Continued)

(52) U.S. Cl.
CPC .............. *H04L 9/0631* (2013.01); *G06F 7/00* (2013.01); *G06F 9/30007* (2013.01);
(Continued)

(58) Field of Classification Search
CPC . G06F 7/726; G06F 7/724; G06F 7/38; H04L 9/0637; H04L 2209/20; H04L 9/0631
(Continued)

(56) References Cited

U.S. PATENT DOCUMENTS 5,808,690 A    9/1998   Rich
6,115,812 A    9/2000   Abdallah et al.
(Continued)

FOREIGN PATENT DOCUMENTS

TW    200531494 A    9/2005
TW    201105080 A    2/2011
(Continued)

OTHER PUBLICATIONS

"Advanced Encryption Standard," Federal Information Processing Standards Publication 197, available at http//csrc.nist.gov/publications/fips, 51 pages.
(Continued)

*Primary Examiner* — Harunur Rashid
(74) *Attorney, Agent, or Firm* — Nicholson De Vos Webster & Elliott LLP (57) ABSTRACT

Implementations of Advanced Encryption Standard (AES) encryption and decryption processes are disclosed. In one embodiment of S-box processing, a block of 16 byte values is converted, each byte value being converted from a polynomial representation in GF(256) to a polynomial representation in $GF((2^2)^4)$. Multiplicative inverse polynomial representations in $GF((2^2)^4)$ are computed for each of the corresponding polynomial representations in $GF((2^2)^4)$. Finally corresponding multiplicative inverse polynomial representations in $GF((2^2)^4)$ are converted and an affine transformation is applied to generate corresponding polynomial representations in GF(256). In an alternative embodiment of S-box processing, powers of the polynomial
(Continued)

representations are computed and multiplied together in GF(256) to generate multiplicative inverse polynomial representations in GF(256). In an embodiment of inverse-columns-mixing, the 16 byte values are converted from a polynomial representation in GF(256) to a polynomial representation in $GF((2^4)^2)$. A four-by-four matrix is applied to the transformed polynomial representation in $GF((2^4)^2)$ to implement the inverse-columns-mixing.

10 Claims, 4 Drawing Sheets

Related U.S. Application Data

No. 11/966,658, filed on Dec. 28, 2007, now Pat. No. 8,923,510.

(51) Int. Cl.
  *G06F 9/30* (2018.01)
  *G06F 21/60* (2013.01)
  *G06F 9/38* (2018.01)

(52) U.S. Cl.
  CPC ...... *G06F 9/30112* (2013.01); *G06F 9/30145* (2013.01); *G06F 9/30149* (2013.01); *G06F 9/30196* (2013.01); *G06F 9/3887* (2013.01); *G06F 21/602* (2013.01); *H04L 2209/34* (2013.01)

(58) Field of Classification Search
  USPC ...................................... 380/28, 29
  See application file for complete search history.

(56) References Cited

U.S. PATENT DOCUMENTS

| | | | |
|---|---|---|---|
| 6,288,723 | B1 | 9/2001 | Huff et al. |
| 6,574,772 | B1* | 6/2003 | Chou ............... G06F 7/724 714/784 |
| 6,766,344 | B2 | 7/2004 | Dubey et al. |
| 7,512,647 | B2 | 3/2009 | Wilson et al. |
| 8,643,659 | B1 | 2/2014 | Baldwin |
| 2001/0020945 | A1 | 9/2001 | Hsieh et al. |
| 2002/0112147 | A1 | 8/2002 | Chennupaty et al. |
| 2002/0178203 | A1 | 11/2002 | Stribaek et al. |
| 2003/0055858 | A1 | 3/2003 | Dubey et al. |
| 2003/0105791 | A1 | 6/2003 | Stein et al. |
| 2003/0212727 | A1 | 11/2003 | Macy et al. |
| 2004/0184602 | A1 | 9/2004 | Nadehara |
| 2006/0093136 | A1* | 5/2006 | Zhang ............... G06F 7/726 380/29 |
| 2007/0186077 | A1 | 8/2007 | Gschwind et al. |
| 2009/0279688 | A1 | 11/2009 | Michaels et al. |
| 2010/0104256 | A1 | 4/2010 | Tsurumi |
| 2011/0052023 | A1 | 3/2011 | Garg et al. |
| 2012/0196679 | A1 | 8/2012 | Newcombe et al. |
| 2014/0169553 | A1 | 6/2014 | Chen et al. |
| 2014/0206443 | A1 | 7/2014 | Sharp et al. |

FOREIGN PATENT DOCUMENTS

| | | | | |
|---|---|---|---|---|
| WO | | 03107177 A2 | 12/2003 | |
| WO | WO | 2004014016 A1 * | 2/2004 | ............. G06F 7/724 |

OTHER PUBLICATIONS

Morioka et al., "An Optimized S-Box Circuit Architecture for Low Power AES Design," Presentatoin, IBM Japan Ltd., Tokyo Research laboratory, (CHES 2002) Aug. 13, 2002.
Rudra et al., "Efficient Rijndael Encryption Implementation with Composite Field Arithmetic," in Proceedings, Workshop on Cryptographic Hardware and embedded Systems (CHES 2001) pp. 175-188, 2001.
Gueron et al., "Masked Inversion in GF(2($2^n$) n) Using Mixed Field Representations and its Efficient Implementation AES," Embedded Cryptographic Hardware: Methodologies & Architectures, Nadia Nedjah and Luiza de Macedo Mourelle (Editors), Nova Science Publishers, Inc. (ISBN: 1-59454-012-8), 2004.
Satoh et al, A Compact Rijnadael Hardware Architecture with S-Box Optimization. 7th International Conference on the Theory and Application on Cryptology ad Information Security Gold Coast, Australia, Sep. 9-13, 2001 Proceedings.
Gaj et al.,"FPGA and ASIC Implementations of AES" ECE Department, George Mason University, USA, 2007, pp. 1-6-.
Krilov et al., "The Use of Finite Field GF (256) in the Performance Primitives Intel IPP" Oct. 7, 2008, pp. 1-12.
Abandonment from U.S. Appl. No. 11/966,658, dated Apr. 23, 2012, 2 pages.
Abandonment from U.S. Appl. No. 14/569,428, dated Oct. 14, 2015, 2 pages.
Abu-Khader N., et al., "Systolic Galois Field Exponentiation in a Multiple-Valued Logic Technique," Integration, the VLSI journal, 2006, vol. 39 (3), pp. 229-251.
Final Office Action from U.S. Appl. No. 11/966,658, dated Oct. 12, 2011, 19 pages.
Final Office Action from U.S. Appl. No. 14/316,511, dated Jul. 5, 2017, 23 pages.
Final Office Action from U.S. Appl. No. 14/316,511, daed May 26, 2016, 15 pages.
Final Office Action from U.S. Appl. No. 14/569,428, dated Nov. 9, 2017, 23 pages.
Kaltofen, et al., "Fast Polynomial Factorization Over High Algebraic Extensions of Finite Fields," ISSAC'97, Maui, Hawaii, USA, 1997, pp. 184-188.
Luong H.V., et al., "A Massively Parallel Approach to Affine Transformation in Medical Image Registration," IEEE International Conference on High Performance Computing and Communications, 2009, pp. 117-123.
Non-Final Office Action from U.S. Appl. No. 11/966,658, dated Apr. 1, 2011, 21 pages.
Non-Final Office Action from U.S. Appl. No. 14/316,511, dated Dec. 22, 2016, 22 pages.
Non-Final Office Action from U.S. Appl. No. 14/316,511, dated Nov. 6, 2015, 15 pages.
Non-Final Office Action from U.S. Appl. No. 14/569,428, dated May 19, 2017, 16 pages.
Notice of Allowance from U.S. Appl. No. 11/966,658, dated Sep. 3, 2014, 9 pages.
Notice of Allowance from U.S. Appl. No. 14/316,624, dated Oct. 18, 2017, 10 pages.
Notice of Allowance from U.S. Appl. No. 14/316,624, dated Oct. 24, 2016, 9 pages.
Notice of Allowance from U.S. Appl. No. 15/405,898, dated Nov. 3, 2017, 4 pages.
Notice of Allowance from U.S. Appl. No. 15/405,898, dated Oct. 11, 2017, 13 pages.
Requirement for Restriction/Election from U.S. Appl. No. 14/316,624, dated Jun. 23, 2016, 5 pages.
Requirement for Restriction/Election from U.S. Appl. No. 15/405,898, dated Jul. 14, 2017, 5 pages.
Sayed M.S., et al., "An Affine-Based Algorithm and SIMD Architecture for Video Compression with Low Bit-Rate Applications," IEEE Transactions on Circuits and Systems for Video Technology, Apr. 2006, vol. 16, No. 4, pp. 457-471.
Search Report from foreign counterpart Taiwan Patent Application No. 104116462, dated Sep. 5, 2016, 1 page.
Wolkerstorfer, et al., "An ASIC Implementation of the AES SBoxes," Springer-Verlag Berlin Heidelberg, 2002, pp. 67-78.
Yamaguchi, et al., "Design of a Massively Parallel Vision Processor based on Multi-SIMD Architecture," IEEE, 2007, 4 pages.
Notice of Allowance from U.S. Appl. No. 14/569,428, dated Apr. 12, 2018, 17 pages.
Office Action and Search Report from foreign counterpart Taiwan Patent Application No. 106120226, dated Apr. 18, 2018, 6 pages.

(56) References Cited

OTHER PUBLICATIONS

Non-Final Office Action from U.S. Appl. No. 14/316,511, dated Nov. 30, 2017, 27 pages.
Notice of Allowance from foreign counterpart Taiwan Patent Application No. 106120226, dated Jun. 27, 2018, 3 pages.

\* cited by examiner

METHOD AND APPARATUS FOR EFFICIENTLY IMPLEMENTING THE ADVANCED ENCRYPTION STANDARD

RELATED APPLICATIONS

This is a Continuation of application Ser. No. 14/569,428, filed Dec. 12, 2012, currently pending which is a Continuation of application Ser. No. 11/966,658, filed Dec. 28, 2007, now U.S. Pat. No. 8,923,510, issued Dec. 30, 2014.

FIELD OF THE DISCLOSURE

This disclosure relates generally to the field of encryption/decryption systems. In particular, the disclosure relates to efficient implementations of the Advanced Encryption Standard.

BACKGROUND OF THE DISCLOSURE

The Advanced Encryption Standard (AES), also known as Rijndael, is a block cipher developed by two Belgian cryptographers, Joan Daemen and Vincent Rijmen and adopted as an encryption standard by the United States government. AES was announced in Nov. 26, 2001 by the National Institute of Standards and Technology (NIST) as U.S. FIPS PUB 197 (FIPS 197).

AES has a fixed block size of 128 bits and a key size of 128, 192 or 256 bits. Key expansion using Rijndael's key schedule transforms the keys of size 128, 192 or 256 bits into 10, 12 or 14 round keys of 128 bits. The round keys are used to process the plaintext data in rounds as 128-bit blocks (viewed as 4-by-4 arrays of bytes) and convert them to ciphertext blocks. Typically, for a 128-bit input to the round (16 bytes) each byte is replaced by another byte according to a lookup table called the S-box. This portion of the block cipher is called SubBytes. Next the rows of bytes (viewed as a 4-by-4 array) are cyclically shifted or rotated left by a particular offset (i.e. row zero by 0 bytes, row one by 1 byte, row two by 2 bytes and row three by 3 bytes). This portion of the block cipher is called ShiftRows. Then each of the columns of bytes are viewed as four coefficients of a polynomial in a finite field, GF(256) (also called Galois field $2^8$), and multiplied by an invertible linear transformation. This portion of the block cipher is called MixColumns. Finally, the 128-bit block is XORed with a round key to produce a ciphertext block of 16 bytes, which is called AddRoundKey.

On systems with 32-bit or larger words, it is possible to implement the AES cipher by converting the SubBytes, ShiftRows and MixColumns transformations into four 256-entry 32-bit tables, which utilize 4096 bytes of memory. One drawback to a software implementation is performance. Software runs orders of magnitude slower than devoted hardware so it is desirable to have the added performance of a hardware/firmware implementation.

Typical straightforward hardware implementations using lookup memories, truth tables, binary decision diagrams or 256 input multiplexers are costly in terms of circuit area. Alternative approaches using finite fields isomorphic to GF(256) may be efficient in area but may also be slower than the straightforward hardware implementations. Thus options that provide efficient space-time design tradeoffs have not been fully explored.

BRIEF DESCRIPTION OF THE DRAWINGS

The present invention is illustrated by way of example and not limitation in the figures of the accompanying drawings.

DETAILED DESCRIPTION

Implementations of Advanced Encryption Standard (AES) encryption and decryption processes are disclosed. In one embodiment of S-box processing, a block of 16 byte values is converted, each byte value being converted from a polynomial representation in GF(256) to a polynomial representation in $GF((2^2)^4)$. Multiplicative inverse polynomial representations in $GF((2^2)^4)$ are computed for each of the corresponding polynomial representations in $GF((2^2)^4)$. Finally corresponding multiplicative inverse polynomial representations in $GF((2^2)^4)$ are converted and an affine transformation is applied to generate corresponding polynomial representations in GF(256). In an alternative embodiment of S-box processing, powers of the polynomial representations are computed and multiplied together in GF(256) to generate multiplicative inverse polynomial representations in GF(256). In an embodiment of inverse-columns-mixing, the 16 byte values are converted from a polynomial representation in GF(256) to a polynomial representation in $GF((2^4)^2)$. A four-by-four matrix is applied to the transformed polynomial representation in $GF((2^4)^2)$ to implement the inverse-columns-mixing.

The AES encryption and decryption processes have useful applications in data encryption and decryption as a block cipher and is widely used. It is one of the most popular algorithms used in symmetric key cryptography for secure financial transactions, identification, digital signatures, and communication privacy. Such application in the technical arts include but are not limited to secure bank transactions and fund transfers, authorization to accounts, private communications over public networks, security of intellectual property assets, etc.

Efficient hardware implementations of AES encryption and decryption processes allow for real time encrypted data in standard encrypted formats. Encrypted data formats for certain particular data or signal types such as communications, financial transactions, audio or motion video for example, which are representative of or constitute communication, physical activity or objects require and can utilize the improved performance of more efficient hardware/firmware implementations as herein disclosed.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Figure 1:
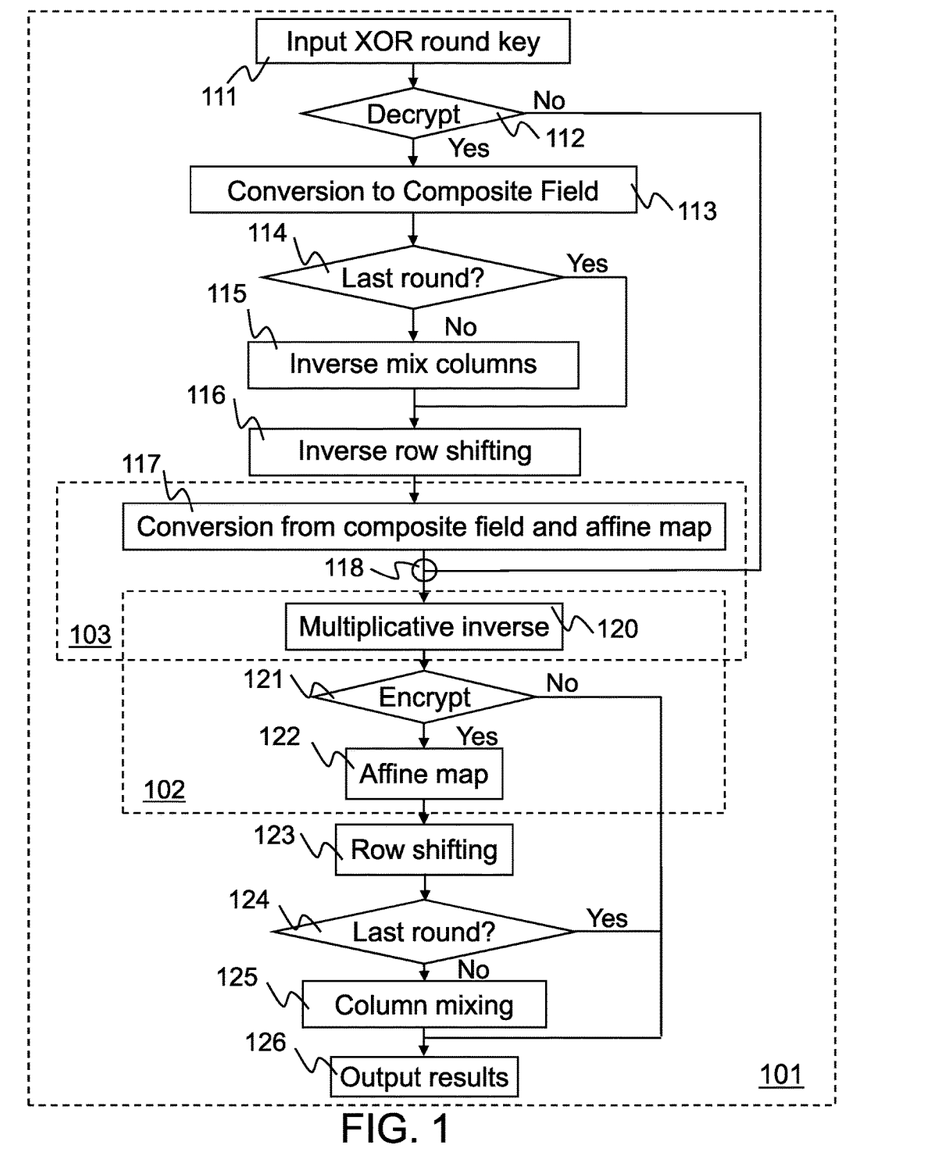
FIG. 1 illustrates a flow diagram for one embodiment of a process for efficiently implementing the Advanced Encryption Standard (AES) encryption/decryption standard.

FIG. 1 illustrates a flow diagram for one embodiment of a process 101 for efficiently implementing rounds of the Advanced Encryption Standard (AES) encryption/decryption standard. Process 101 and other processes herein disclosed are performed by processing blocks that may comprise dedicated hardware or software or firmware operation codes executable by general purpose machines or by special purpose machines or by a combination of both. In the example illustrated below the composite field $GF((2^4)^2)$ is used with the irreducible polynomial, $x^4+x^2+x+1$ and $x^2+2x+0xE$, for the AES inverse-columns-mix transformation.

In processing block 111 a 128-bit input block including 16 byte values is logically exlusive-ORed (XORed) with a round key. In processing block 112 it is determined whether the process is encrypting, in which case processing continues from point 118, or if the process is decrypting, in which case processing resumes in processing block 113.

In processing block 113 a field conversion circuit is used to convert each of the 16 byte values, respectively, from a corresponding polynomial representation in GF(256) to another corresponding polynomial representation in the composite field $GF((2^4)^2)$. For one embodiment of processing block 113, a polynomial representation in GF(256), $[a_7, a_6, a_5, a_4, a_3, a_2, a_1, a_0]$, can be converted to a corresponding polynomial representation in the composite field $GF((2^4)^2)$), $[b_7, b_6, b_5, b_4, b_3, b_2, b_1, b_0]$, by multiplication of each byte value with an 8-bit by 8-bit conversion matrix, which may be implemented by a series of XORs as follows:

$b_0 = a_0 \oplus a_2 \oplus a_3 \oplus a_4 \oplus a_5 \oplus a_6 \oplus a_7$,
$b_1 = a_7$,
$b_2 = a_4 \oplus a_5 \oplus a_7$,
$b_3 = a_1 \oplus a_3 \oplus a_5 \oplus a_6$,
$b_4 = a_4 \oplus a_5 \oplus a_6$,
$b_5 = a_1 \oplus a_4 \oplus a_5 \oplus a_6$,
$b_6 = a_5 \oplus a_7$,
$b_7 = a_2 \oplus a_3 \oplus a_4 \oplus a_6 \oplus a_7$.

At this point the 16 bytes may be viewed a four-by-four block of bytes having four rows and having four columns. In processing block 114 it is determined if the present round is the last/special round, in which case no inverse column mixing is performed, or otherwise in processing block 115 an inverse-columns-mixing circuit is used to compute an inverse-columns-mixing transformation in $GF((2^4)^2)$ of the 16 byte values to get corresponding transformed polynomial representations in $GF((2^4)^2)$. For one embodiment the inverse-columns-mixing transformation in $GF((2^4)^2)$ of the 16 byte input values can be performed as follows:

$$Output = \begin{vmatrix} 0 \times 20 & 0 \times 40 & 0 \times 09 & 0 \times 88 \\ 0 \times 88 & 0 \times 20 & 0 \times 40 & 0 \times 09 \\ 0 \times 09 & 0 \times 88 & 0 \times 20 & 0 \times 40 \\ 0 \times 40 & 0 \times 09 & 0 \times 88 & 0 \times 20 \end{vmatrix} \cdot input$$

It will be appreciated that such a matrix multiplication can be performed on $[a_3, a_2, a_1, a_0, b_3, b_2, b_1, b_0]$ in $GF((2^4)^2)$ by computing, in a first stage, the unique terms needed to perform the multiplications by the matrix constants in the expression for each result, and then summing the unique terms to generate each result. For example the unique terms necessary for computing the above matrix multiplication, from the nibble $[a_3, a_2, a_1, a_0]$, are: $(a_3 \oplus a_0) \oplus a_1$, $(a_2 \oplus a_1) \oplus a_3$, $(a_2 \oplus a_0) \oplus a_1$, $(a_3 \oplus a_2) \oplus a_0$, $a_3 \oplus a_1$, $(a_3 \oplus a_2) + (a_1 \oplus a_0)$. The unique terms necessary for computing the above matrix multiplication, from the nibble $[b_3, b_2, b_1, b_0]$, are: $(b_3 \oplus b_2) \oplus b_1$, $(b_2 \oplus b_1) \oplus b_3$, $b_3 \oplus b_0$, $b_3 \oplus b_1$, $b_1$, $b_1 \oplus b_0$, $(b_3 \oplus b_0) + (b_1 \oplus b_2)$.

In any case of what is determined in processing block 114, in processing block 116 a hard-wired permutation of the rows is performed on the 16 byte values corresponding to an inverse row mixing transformation. In processing block 117 a second field conversion circuit is used to convert each corresponding transformed polynomial representation in $GF((2^4)^2)$ and also to apply an inverse affine transformation to generate, respectively, a third corresponding polynomial representation in a finite field other than $GF((2^4)^2)$. In one embodiment of process 101 that new finite field other than $GF((2^4)^2)$ is the composite field $GF((2^2)^4)$. This embodiment is described below in greater detail with regard to FIG. 2. In an alternative embodiments of process 101 that new finite field is the original field GF(256). These embodiments are described below in greater detail with regard to FIGS. 3*a* and 3*b*.

Continuing from point 118, a multiplicative inverse circuit is used in processing block 120 to compute, for each of the third corresponding polynomial representations of the 16 byte values respectively, a corresponding multiplicative inverse polynomial representation in that new finite field other than $GF((2^4)^2)$. In processing block 121 it is determined whether the process is decrypting, in which case round processing is finished and outputs a result in processing block 126, or if the process is encrypting, in which case processing resumes in processing block 122.

In processing block 122 a circuit is used to apply an affine transformation to each corresponding multiplicative inverse polynomial representation of the 16 byte values to generate, respectively, a transformed corresponding polynomial representation in that new finite field other than $GF((2^4)^2)$. If that new finite field is not the original field GF(256), then another field conversion can be combined with the circuit in block 122 to convert each corresponding transformed polynomial representation back to the original field GF(256). Therefore, it may be assumed that the polynomial representation for the remainder of process 101 is in the original field GF(256).

In processing block 123 a hard-wired permutation of the rows is performed on the 16 byte values corresponding to a forward row mixing transformation. In processing block 124 it is determined if the present round is the last/special round, in which case no column mixing is performed, or otherwise in processing block 125 a forward-columns-mixing circuit is used to compute a forward-columns-mixing transformation in GF(256) of the 16 byte values to get corresponding transformed polynomial representations in GF(256).

It will be appreciated that because coefficients are relatively small in the forward-columns-mixing transformation in GF(256), no alternative field representation is used in processing block 125. Finally, the round processing of process 101 is finished and the 16 byte result is output in processing block 126.

Figure 2:
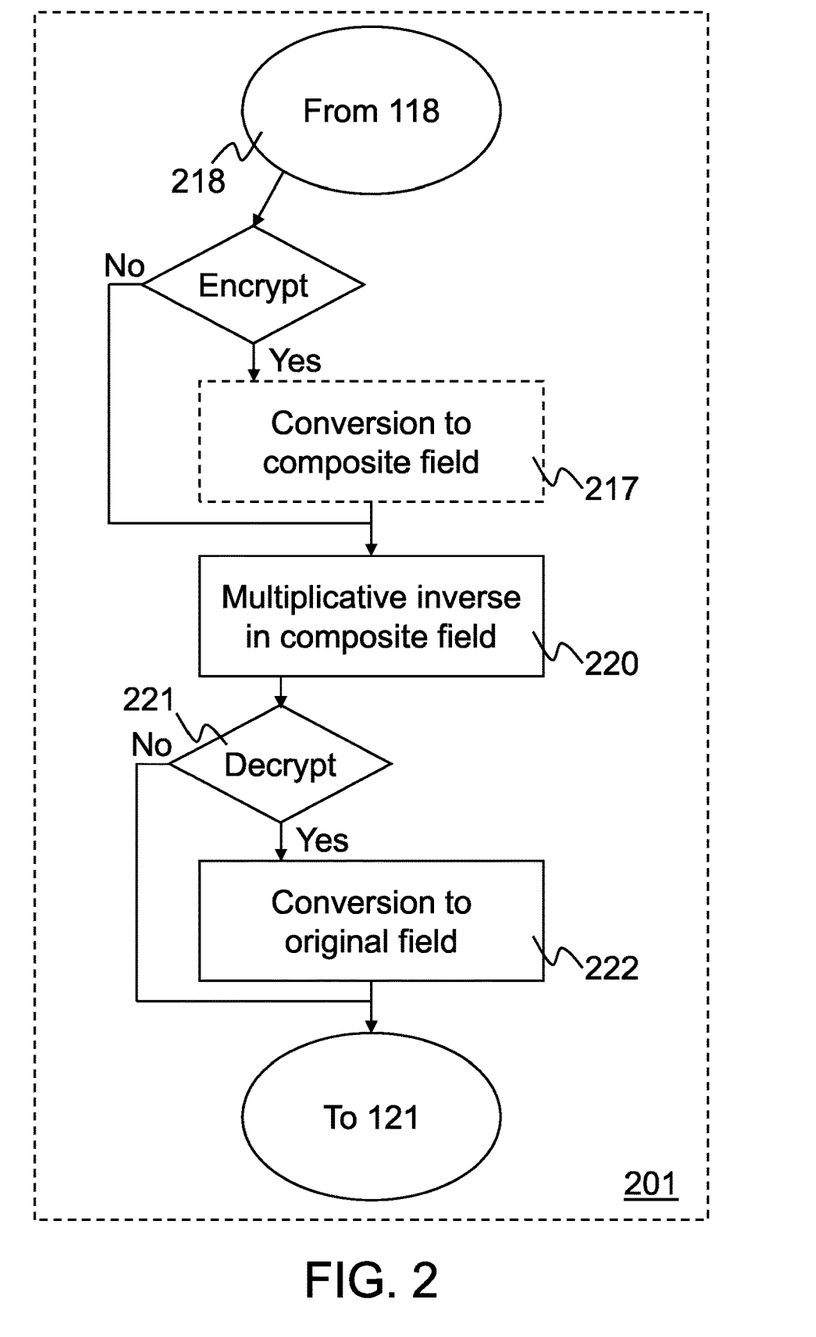
FIG. 2 illustrates a flow diagram for one embodiment of a process for efficiently implementing a multiplicative inverse of an AES S-box.

FIG. 2 illustrates a flow diagram for one embodiment of a process 201 for efficiently implementing a multiplicative inverse of an AES S-box. In the example illustrated below the composite field $GF((2^2)^4)$ is used with the irreducible polynomial, $x^4+x^3+x^2+2$, for the S-box transformation.

Continuing from point 118 of process 101, at processing block 218 it is determined whether the process is encrypting, in which case processing continues in processing block 219. Otherwise if the process is decrypting, a field conversion was already performed in processing block 117 and the third corresponding polynomial representations of the 16 byte values are in the composite field $GF((2^2)^4)$. For one embodiment of processing block 117, an inverse affine transformation can be applied and a polynomial representation in the composite field GF(($2^4$)$^2$)), [$a_7$, $a_6$, $a_5$, $a_4$, $a_3$, $a_2$, $a_1$, $a_0$], can be converted to a corresponding polynomial representation in the composite field GF(($2^2$)$^4$)), [$b_7$, $b_6$, $b_5$, $b_4$, $b_3$, $b_2$, $b_1$, $b_0$], by multiplication of each byte value with an 8-bit by 8-bit conversion matrix and XORs of some constants (i.e. bitwise inversions), which may be implemented by a series of XORs as follows:

¬$b_0$=$a_3$⊕$a_5$⊕$a_7$,
$b_1$=$a_1$⊕$a_2$⊕$a_3$⊕$a_4$,
$b_2$=$a_0$⊕$a_2$⊕$a_4$⊕$a_5$⊕$a_6$,
$b_3$=$a_0$⊕$a_1$⊕$a_2$⊕$a_4$⊕$a_5$⊕$a_6$,
¬$b_4$=$a_1$⊕$a_6$,
$b_5$=$a_0$⊕$a_1$⊕$a_2$⊕$a_3$⊕$a_5$⊕$a_6$⊕$a_7$,
¬$b_6$=$a_0$⊕$a_5$⊕$a_6$,
$b_7$=$a_0$⊕$a_1$⊕$a_2$⊕$a_3$⊕$a_4$⊕$a_6$.

In processing block 219 a field conversion is needed for the encryption process and so a field conversion circuit is used to convert each of the 16 byte values, respectively, from a corresponding polynomial representation in GF(256) to a corresponding polynomial representation in the composite field GF(($2^2$)$^4$). For one embodiment of processing block 219, a polynomial representation in GF(256), [$a_7$, $a_6$, $a_5$, $a_4$, $a_3$, $a_2$, $a_1$, $a_0$], can be converted to a corresponding polynomial representation in the composite field GF(($2^2$)$^4$)), [$b_7$, $b_6$, $b_5$, $b_4$, $b_3$, $b_2$, $b_1$, $b_0$], by multiplication of each byte value with an 8-bit by 8-bit conversion matrix, which may be implemented by a series of XORs as follows:

$b_0$=$a_0$⊕$a_1$⊕$a_6$,
$b_1$=$a_1$⊕$a_4$⊕$a_6$,
$b_2$=$a_5$⊕$a_6$⊕$a_7$,
$b_3$=$a_3$⊕$a_4$,
$b_4$=$a_1$⊕$a_2$⊕$a_3$⊕$a_4$⊕$a_5$,
$b_5$=$a_3$⊕$a_4$⊕$a_5$⊕$a_7$,
$b_6$=$a_2$⊕$a_5$⊕$a_6$,
$b_7$=$a_3$⊕$a_7$.

In processing block 220 an inversion circuit is used to compute for each of the polynomial representations in GF(($2^2$)$^4$) of the 16 byte values, respectively, a multiplicative inverse polynomial representation in GF(($2^2$)$^4$). For one embodiment, an input corresponding to a polynomial representation in the composite field GF(($2^2$)$^4$)), [a, b, c, d], and a multiplicative inverse, [A, B, C, D], are related as follows:

$$(a⊕c⊕d)·A⊕(b⊕c)·B⊕(a⊕b)·C⊕a·D=0$$

$$(2·a⊕b⊕c)·A⊕(a⊕b⊕d)·B⊕(a⊕c)·C⊕b·D=0$$

$$(2·a⊕2{\sim}b)·A⊕(2·a)·B⊕d·C⊕c·D=0$$

$$(2·b⊕2·c)·A⊕(2a⊕2{\sim}b)·B⊕(2·a)·C⊕d·D=1$$

where β and '·' denote the GF($2^2$) additions and multiplications, respectively. The solution is: A=$\Delta^{-1}$·$\Delta_a$, B=$\Delta^{-1}$·$\Delta_b$, C=$\Delta^{-1}$·$\Delta_c$, D=$\Delta^{-1}$·$\Delta_d$, where the determinant $\Delta$ is given by:

$$\Delta = \begin{vmatrix} a⊕c⊕d & b⊕c & a⊕b & a \\ 2·a⊕b⊕c & a⊕b⊕d & a⊕c & b \\ 2·a⊕2·b & 2·a & d & c \\ 2·b⊕2·c & 2·a⊕2·b & 2·a & d \end{vmatrix}$$

and the determinants $\Delta_a$, $\Delta_b$, $\Delta_c$ and $\Delta_d$ result from $\Delta$ by replacing the first, second, third and fourth columns of $\Delta$ with {0, 0, 0, 1} respectively. Again it will be appreciated that such computations may be carried out in GF($2^2$) by expanding the determinant calculation, computing the unique terms in hardware, such as $a^2$, $b^2$, $a^3$, 3·$b^2$, etc. and the unique sums of terms required, and then summing the particular term combinations to generate the necessary results.

In processing block 221 it is determined whether the process is decrypting, in which case processing continues in processing block 222. In processing block 222 another field conversion circuit is used to convert each of the 16 byte values, respectively, from a corresponding polynomial representation in the composite field GF(($2^2$)$^4$) to a corresponding polynomial representation in GF(256). For one embodiment of processing block 222, a polynomial representation in the composite field GF(($2^2$)$^4$)), [$a_7$, $a_6$, $a_5$, $a_4$, $a_3$, $a_2$, $a_1$, $a_0$], can be converted to a corresponding polynomial representation in GF(256), [$b_7$, $b_6$, $b_5$, $b_4$, $b_3$, $b_2$, $b_1$, $b_0$], by multiplication of each byte value with an 8-bit by 8-bit conversion matrix, which may be implemented by a series of XORs as follows:

$b_0$=$a_0$⊕$a_3$⊕$a_4$⊕$a_6$,
$b_1$=$a_2$⊕$a_4$⊕$a_5$⊕$a_6$,
$b_2$=$a_1$⊕$a_2$⊕$a_4$⊕$a_7$,
$b_3$=$a_1$⊕$a_4$⊕$a_6$,
$b_4$=$a_1$⊕$a_3$⊕$a_4$⊕$a_6$,
$b_5$=$a_1$⊕$a_3$⊕$a_4$⊕$a_5$⊕$a_6$⊕$a_7$,
$b_6$=$a_2$⊕$a_3$⊕$a_5$,
$b_7$=$a_1$⊕$a_4$⊕$a_6$⊕$a_7$.

Otherwise if the process is encrypting, processing proceed to processing block 121 of process 101. As it was explained with regard to processing block 122 of process 101, the circuit that is used to apply an affine transformation to the 16 bytes in processing block 122 can be combined with the field conversion circuit of this embodiment to convert the 16 byte values from polynomial representations in GF(($2^2$)$^4$) to corresponding polynomial representations in GF(256). For one embodiment of processing block 122, an affine transformation can be applied and a polynomial representation in the composite field GF(($2^2$)$^4$)), [$a_7$, $a_6$, $a_5$, $a_4$, $a_3$, $a_2$, $a_1$, $a_0$], can be converted to a corresponding polynomial representation in GF(256), [$b_7$, $b_6$, $b_5$, $b_4$, $b_3$, $b_2$, $b_1$, $b_0$], by multiplication of each byte value with an 8-bit by 8-bit conversion matrix and XORs with some constants (i.e. bitwise inversions), which may be implemented by a series of XORs as follows:

¬$b_0$=$a_0$⊕$a_1$⊕$a_2$,
¬$b_1$=$a_0$⊕$a_3$⊕$a_5$,
$b_2$=$a_0$⊕$a_2$⊕$a_6$,
$b_3$=$a_0$⊕$a_1$⊕$a_3$⊕$a_4$⊕$a_5$,
$b_4$=$a_0$⊕$a_1$⊕$a_4$⊕$a_5$⊕$a_7$,
¬$b_5$=$a_4$,
¬$b_6$=$a_3$⊕$a_6$,
$b_7$=$a_2$⊕$a_3$.

Figure 3A:
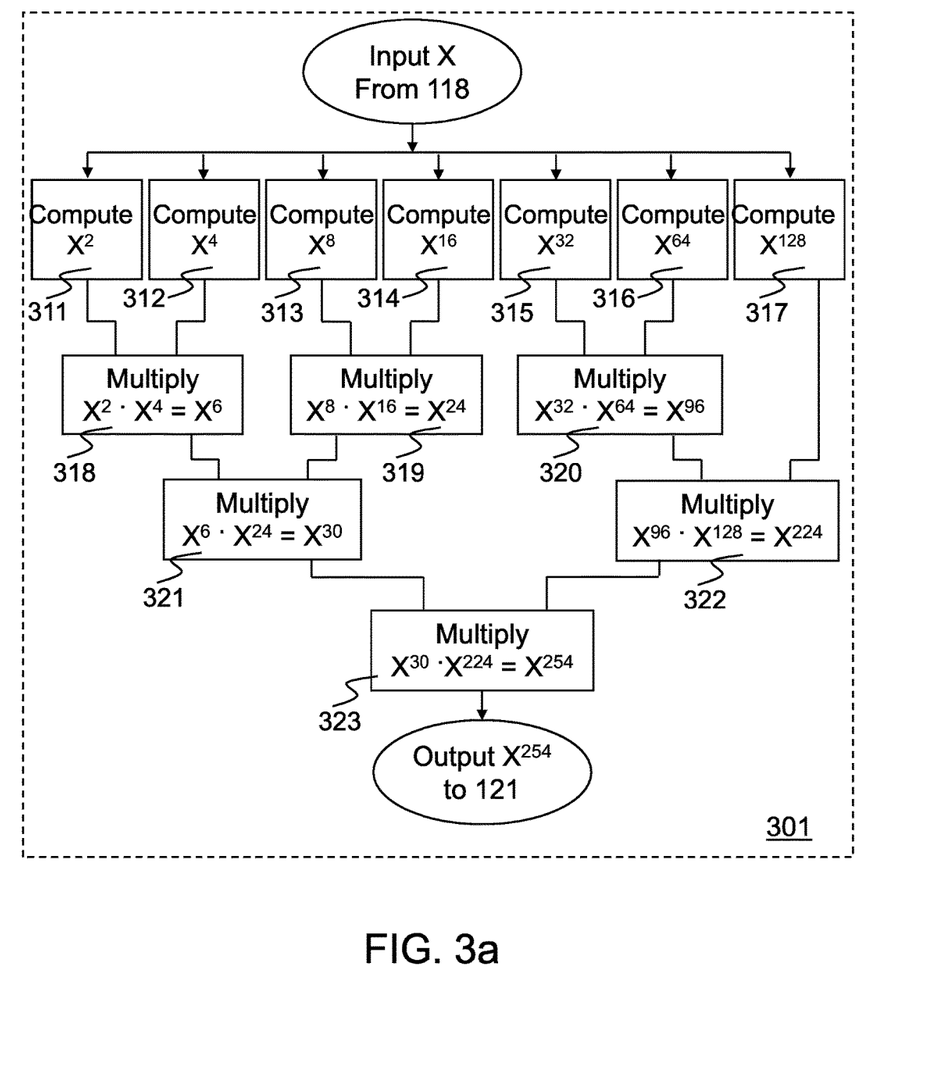
FIG. 3a illustrates a flow diagram for an alternative embodiment of a process for efficiently implementing a multiplicative inverse of an AES S-box.

FIG. 3a illustrates a flow diagram for an alternative embodiment of a process 301 for efficiently implementing a multiplicative inverse of an AES S-box on a 128-bit block including 16 byte values, each byte having a polynomial representation in GF(256). In process 301 we consider each byte X being input from point 118 of process 101. Processing blocks 311-317 comprise a byte slice of a polynomial-powers generating circuit to compute for each of the 16 byte values, respectively, byte values having polynomial representations in GF(256) corresponding to powers, $X^2$, $X^4$, $X^8$, $X^{16}$, $X^{32}$, $X^{64}$ and $X^{128}$ of the polynomial representation of their respective byte value X. Processing blocks 318-323 comprise a byte slice of a multiplier circuit to multiply together in GF(256) the byte values corresponding to powers of the polynomial representations for each of the 16 byte values, respectively, to produce 16 byte values each having a polynomial representation in GF(256) corresponding to the multiplicative inverse, $X^{-1}=X^{254}$, of their respective byte value X. These 16 multiplicative inverse byte values are then output to processing block 121 of process 101 where an affine transform circuit is optionally used in processing block 122 to apply an affine transformation dependent upon whether process 101 is performing encryption or decryption.

Figure 3B:
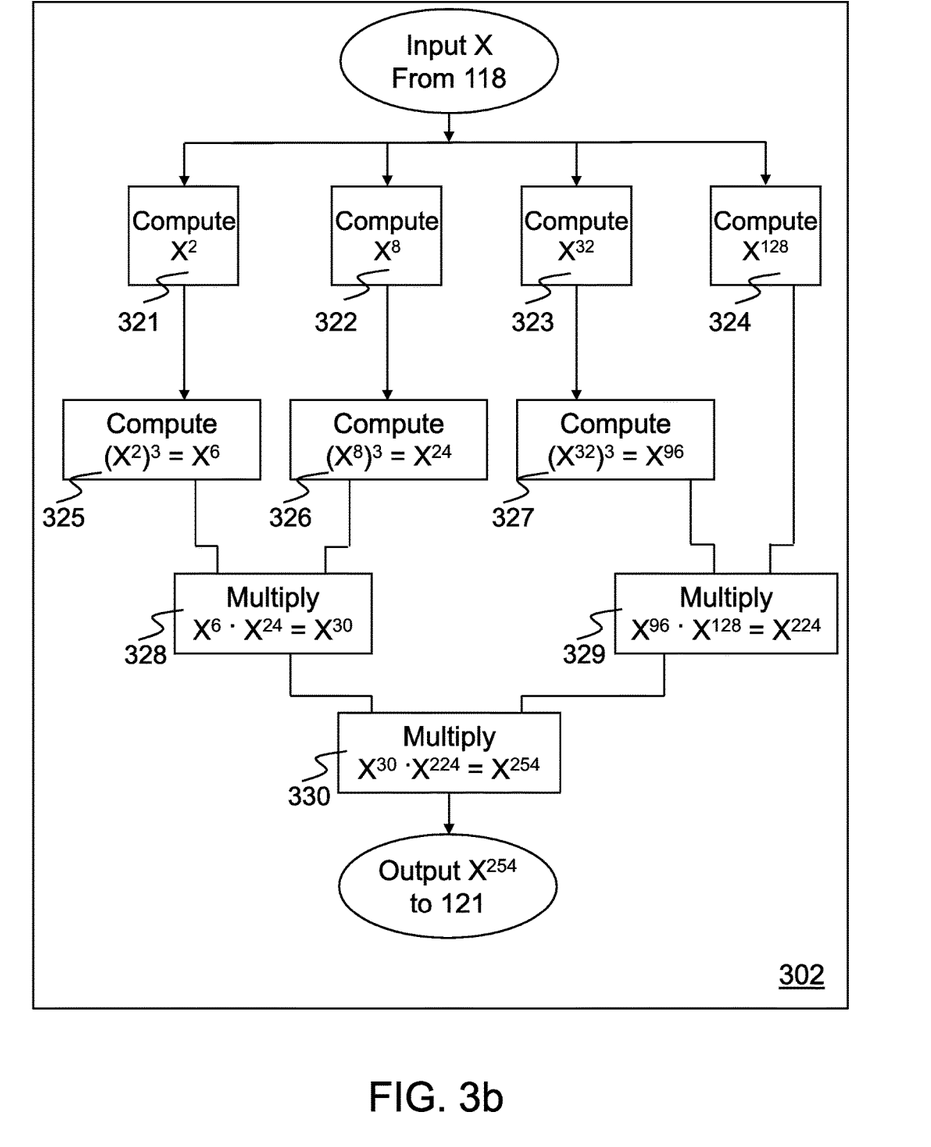
FIG. 3b illustrates a flow diagram for another alternative embodiment of a process for efficiently implementing a multiplicative inverse of an AES S-box

FIG. 3b illustrates a flow diagram for another alternative embodiment of a process 302 for efficiently implementing a multiplicative inverse of an AES S-box on 16 byte values having polynomial representations in GF(256). In process 302 we again consider each byte X being input from point 118 of process 101. Processing blocks 321-327 comprise a byte slice of a polynomial-powers generating circuit to compute for each of the 16 byte values, respectively, byte values having polynomial representations in GF(256) corresponding to powers, $X^6$, $X^{24}$, $X^{96}$ and $X^{128}$ of the polynomial representation of their respective byte value X. Processing blocks 328-330 comprise a byte slice of a multiplier circuit to multiply together in GF(256) the byte values corresponding to powers of the polynomial representations for each of the 16 byte values, respectively, to produce 16 byte values each having a polynomial representation in GF(256) corresponding to the multiplicative inverse, $X^{-1}=X^{254}$, of their respective byte value X. The 16 multiplicative inverse byte values are output to processing block 121 of process 101 where an affine transform circuit is optionally used in processing block 122 to apply an affine transformation dependent upon whether process 101 is performing encryption or decryption.

It will be appreciated that the circuits illustrated for embodiments of the invention in FIGS. 3a and 3b are not unique and be modified in arrangement and detail by those skilled in the art, and that many different combinations of byte values corresponding to powers of the polynomial could be generated and multiplied together without departing from the principles of the present invention.

The above description, in general, is intended to illustrate preferred embodiments of the present invention. From the discussion above it should also be apparent that especially in such an area of technology, where growth is fast and further advancements are not easily foreseen, the invention be modified in arrangement and detail by those skilled in the art without departing from the principles of the present invention within the scope of the accompanying claims and their equivalents.

What is claimed is:

1. An apparatus implementing an Advanced Encryption Standard (AES) S-box encryption process on a 128-bit block including a first 16 byte values each byte having a polynomial representation in GF(256), the apparatus comprising:
 a polynomial-powers generating circuit to compute for each of the first 16 byte values, respectively, a plurality of second byte values having polynomial representations in GF(256) corresponding to a plurality of powers of the polynomial representation of their respective byte value of the first 16 byte values;
 a multiplier circuit to multiply together in GF(256) the plurality of second byte values for each of the first 16 byte values, respectively, to produce a third 16 byte values each having a polynomial representation in GF(256) corresponding to the multiplicative inverse of their respective byte value of the first 16 byte values; and
 an affine transform circuit to apply an affine transformation to the multiplicative inverses of the 16 byte values to generate, respectively, a fourth 16 byte values each having a polynomial representation in GF(256) wherein applying the affine transformation to generate a fourth 16 byte values having polynomial representation in GF(256) is performed by a multiplication of each corresponding multiplicative inverse polynomial representation with an 8-bit by 8-bit product matrix and a subsequent XOR with a constant byte value.

2. The apparatus of claim 1 wherein the multiplication of each corresponding multiplicative inverse polynomial representation with an 8-bit by 8-bit product matrix and a subsequent XOR with a constant byte value is implemented by a series of XORs.

3. An apparatus implementing an Advanced Encryption Standard (AES) decryption process on a 128-bit block including 16 byte values, the apparatus comprising:
 a first field conversion circuit to convert each of the 16 byte values, respectively, from a first corresponding polynomial representation in GF(256) to a second corresponding polynomial representation in $GF((2^4)^2)$;
 an inverse-columns-mixing circuit to compute an inverse-columns-mixing transformation in $GF((2^4)^2)$ of the 16 byte values to get corresponding transformed polynomial representations in $GF((2^4)^2)$;
 a second field conversion circuit to convert each corresponding transformed polynomial representation in $GF((2^4)^2)$ and apply an inverse affine transformation to generate, respectively, a third corresponding polynomial representation in a finite field other than $GF((2^4)^2)$; and
 a multiplicative inverse circuit to compute for each of the third corresponding polynomial representations of the 16 byte values, respectively, a corresponding multiplicative inverse polynomial representation in said finite field other than GF $GF((2^4)^2)$ wherein the first converting of each of the 16 byte values to a second corresponding polynomial representation in GF((24)2) is performed by a multiplication of each of the 16 byte values with an 8-bit by 8-bit conversion matrix.

4. The apparatus of claim 3 wherein the multiplication of each byte value with an 8-bit by 8-bit conversion matrix is implemented by a series of XORs.

5. The apparatus of claim 3 wherein the third corresponding polynomial representations of the 16 byte values are in GF(256), the multiplicative inverse circuit comprising:
 a polynomial-powers generating circuit to compute for each of the third corresponding polynomial representations, respectively, a plurality of fourth byte values having polynomial representations in GF(256) corresponding to a plurality of powers of the third polynomial representation of their respective byte value;
 a multiplier circuit to multiply together in GF(256) the plurality of fourth byte values for each of the third corresponding polynomial representations, respectively, to produce a fifth 16 byte values each having a polynomial representation in GF(256) corresponding to the multiplicative inverse of their respective byte value of the third corresponding polynomial representations.

6. The apparatus of claim 3 wherein the second converting of each corresponding multiplicative inverse polynomial representation and applying an affine transformation to generate a third corresponding polynomial representation in a finite field other than $GF((2^4)^2)$ is performed by a multiplication of each corresponding multiplicative inverse polynomial representation with an 8-bit by 8-bit product matrix and an XOR with a constant byte value.

7. The apparatus of claim 6 wherein the multiplication of each corresponding multiplicative inverse polynomial representation with an 8-bit by 8-bit product matrix and a XOR with a constant byte value is implemented by a series of XORs.

8. The apparatus of claim 3 wherein the third corresponding polynomial representations of the 16 byte values are in $GF((2^2)^4)$, the multiplicative inverse circuit comprising:

an inversion circuit to compute for each of the third corresponding polynomial representations in $GF((2^2)^4)$ of the 16 byte values, respectively, a corresponding multiplicative inverse polynomial representation in $GF((2^2)^4)$; and a third field conversion circuit to convert each corresponding multiplicative inverse polynomial representation in $GF((2^2)^4)$ to generate, respectively, a fourth corresponding polynomial representation in GF(256).

9. A method for implementing an Advanced Encryption Standard (AES) S-box encryption process on a 128-bit block including a first 16 byte values each byte having a polynomial representation in GF(256), the method comprising:

computing for each of the first 16 byte values, respectively, in a polynomial-powers generating circuit, a plurality of second byte values having polynomial representations in GF(256) corresponding to a plurality of powers of the polynomial representation of their respective byte value of the first 16 byte values;

producing a third 16 byte values, each having a polynomial representation in GF(256) corresponding to the multiplicative inverse of their respective byte value of the first 16 byte values, in a multiplier circuit by multiplying together in GF(256) the plurality of second byte values for each of the first 16 byte values, respectively; and applying an affine transformation to the multiplicative inverses of the 16 byte values in an affine transform circuit to generate, respectively, a fourth 16 byte values each having a polynomial representation in GF(256) wherein applying the affine transformation to generate a fourth 16 byte values having polynomial representation in GF(256) is performed by a multiplication of each corresponding multiplicative inverse polynomial representation with an 8-bit by 8-bit product matrix and a subsequent XOR with a constant byte value.

10. The method of claim 9 wherein the multiplication of each corresponding multiplicative inverse polynomial representation with an 8-bit by 8-bit product matrix and a subsequent XOR with a constant byte value is implemented by a series of XORs.

* * * * *